United States Patent [19]

Johnson, Jr.

[11] 4,401,446
[45] Aug. 30, 1983

[54] METHOD AND APPARATUS FOR INCREASING THE EFFICIENCY OF INTERNAL COLLECTION FILTER BAGS

[75] Inventor: Allen S. Johnson, Jr., Salisbury, N.C.

[73] Assignee: Frances H. Johnson, Salisbury, N.C.

[21] Appl. No.: 315,938

[22] Filed: Oct. 28, 1981

[51] Int. Cl.³ .............................................. B01D 46/02
[52] U.S. Cl. .................................. 55/97; 55/341 NT; 55/368; 55/418
[58] Field of Search .................. 55/97, 368, 418, 309, 55/341 NT; 210/486, 497.01

[56] References Cited

U.S. PATENT DOCUMENTS

| | | |
|---|---|---|
| 2,717,484 | 9/1955 | Hofstetter .......................... 55/368 X |
| 3,155,474 | 11/1964 | Sexton .................................. 55/418 |
| 3,241,297 | 3/1966 | Hanes ................................ 55/368 X |
| 3,732,075 | 5/1973 | Acaba .............................. 55/368 X |
| 4,235,610 | 11/1980 | Richard .............................. 55/302 |

FOREIGN PATENT DOCUMENTS 381367  11/1973  U.S.S.R. ............................... 55/368

*Primary Examiner*—Kathleen J. Prunner
*Attorney, Agent, or Firm*—Bell, Seltzer, Park & Gibson

[57] ABSTRACT

One or more hollow tubular air channeling members are positioned in the interior of an internal collection type filter bag to separate the incoming dirty air into a plurality of portions essentially confined from each other and to direct these separated and confined portions of dirty air to different interior portions of the bag and thereby increase the effective filtering efficiency of the bag and also increase useful bag life.

14 Claims, 12 Drawing Figures

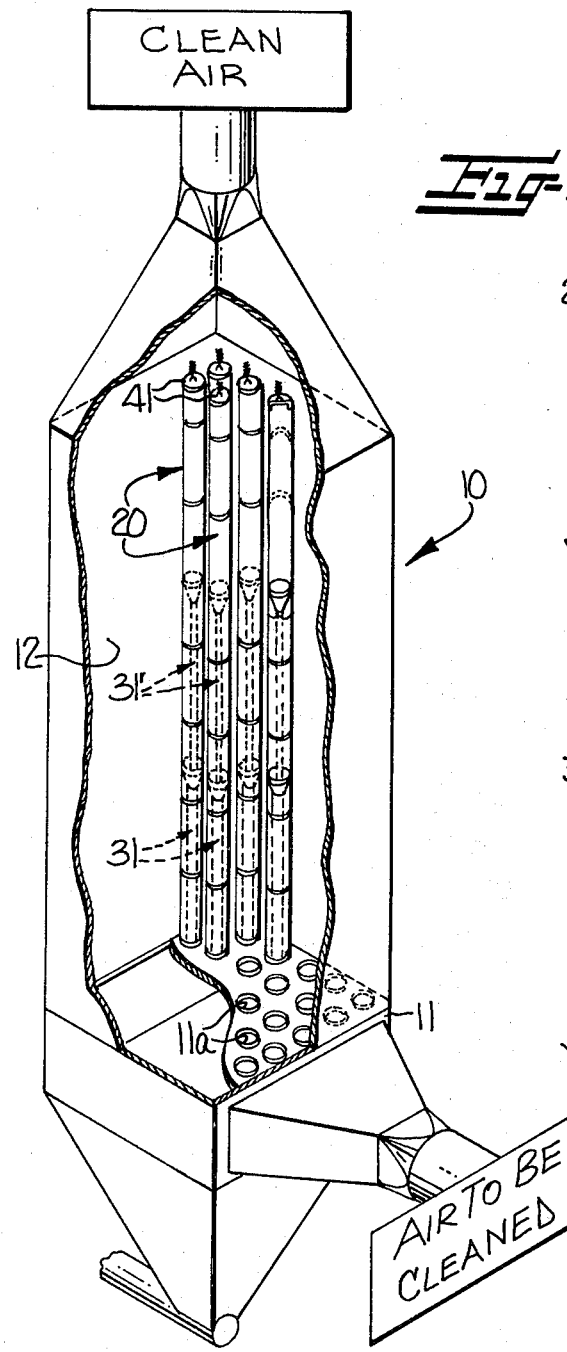
Fig-1
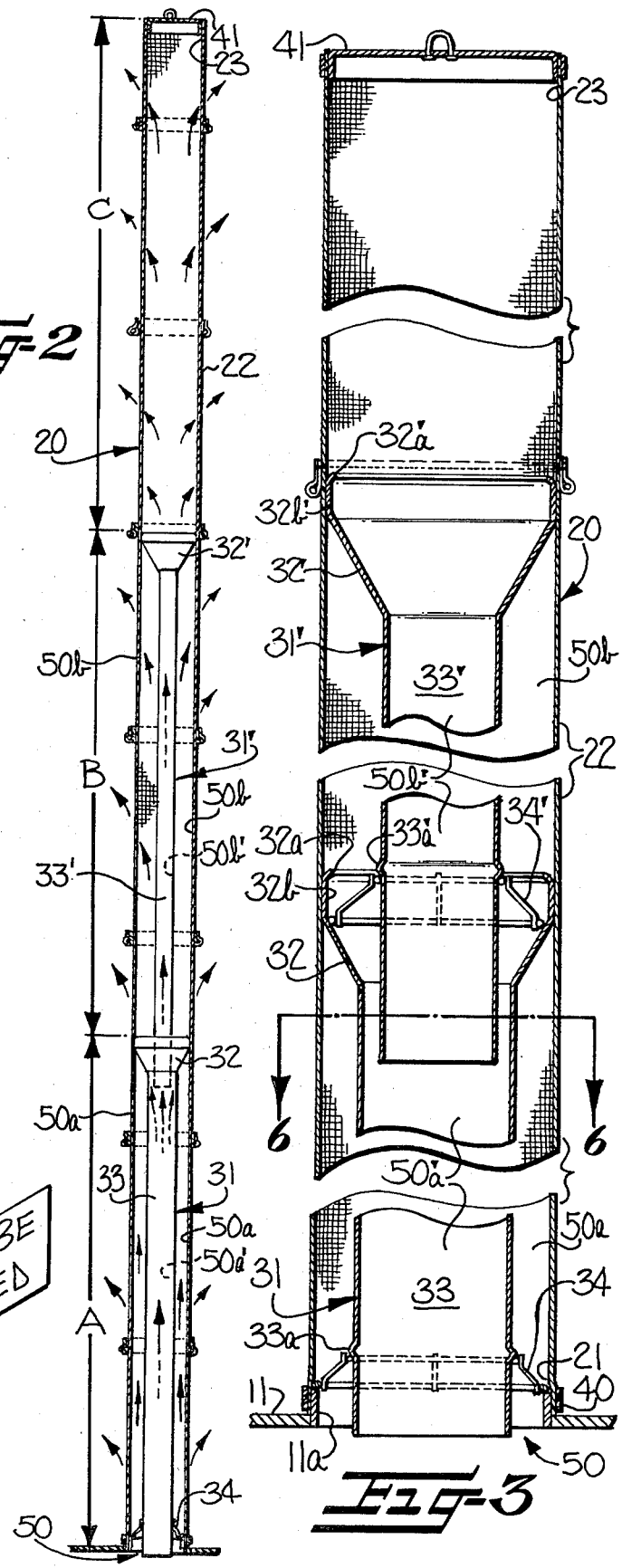
Fig-2
Fig-3

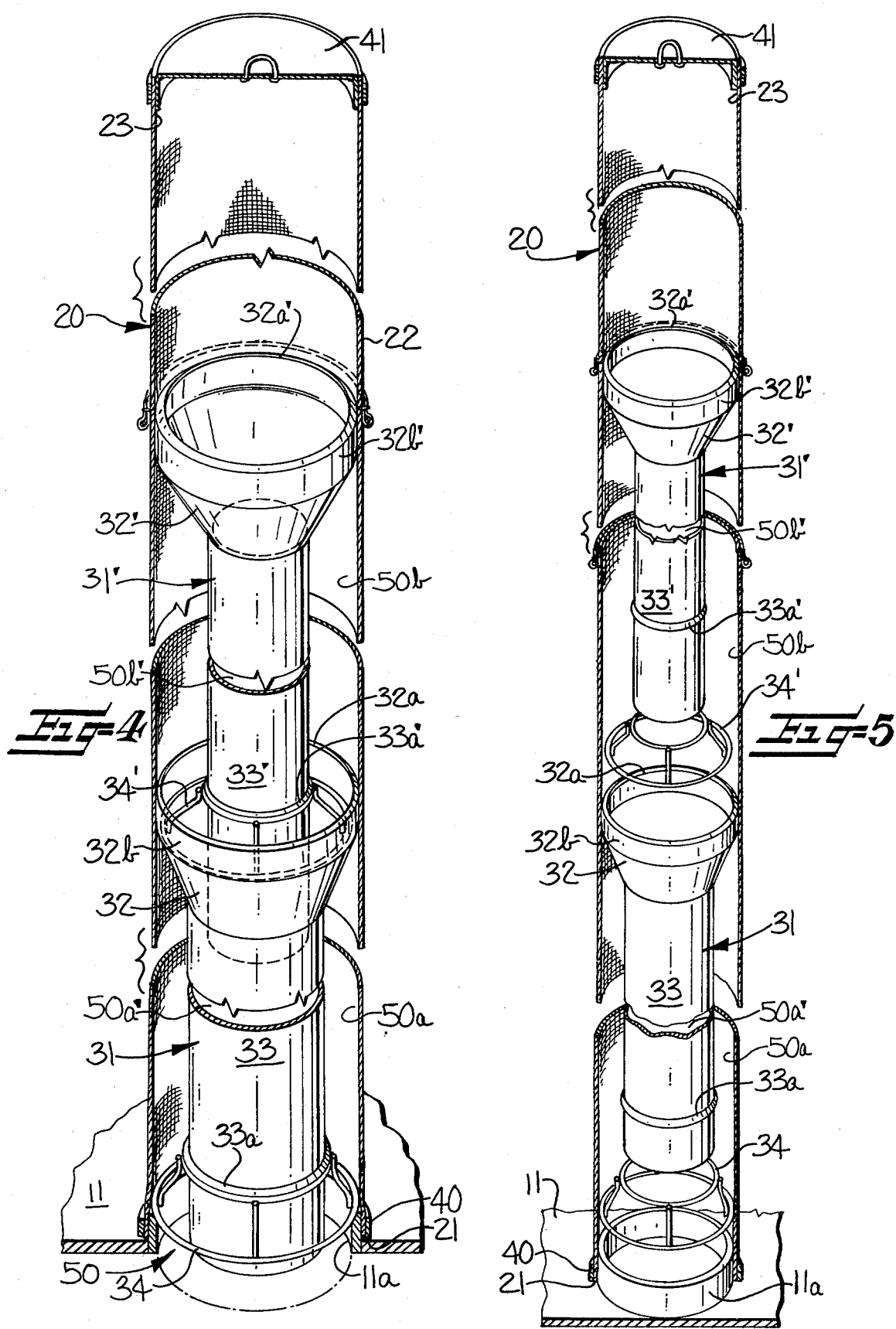

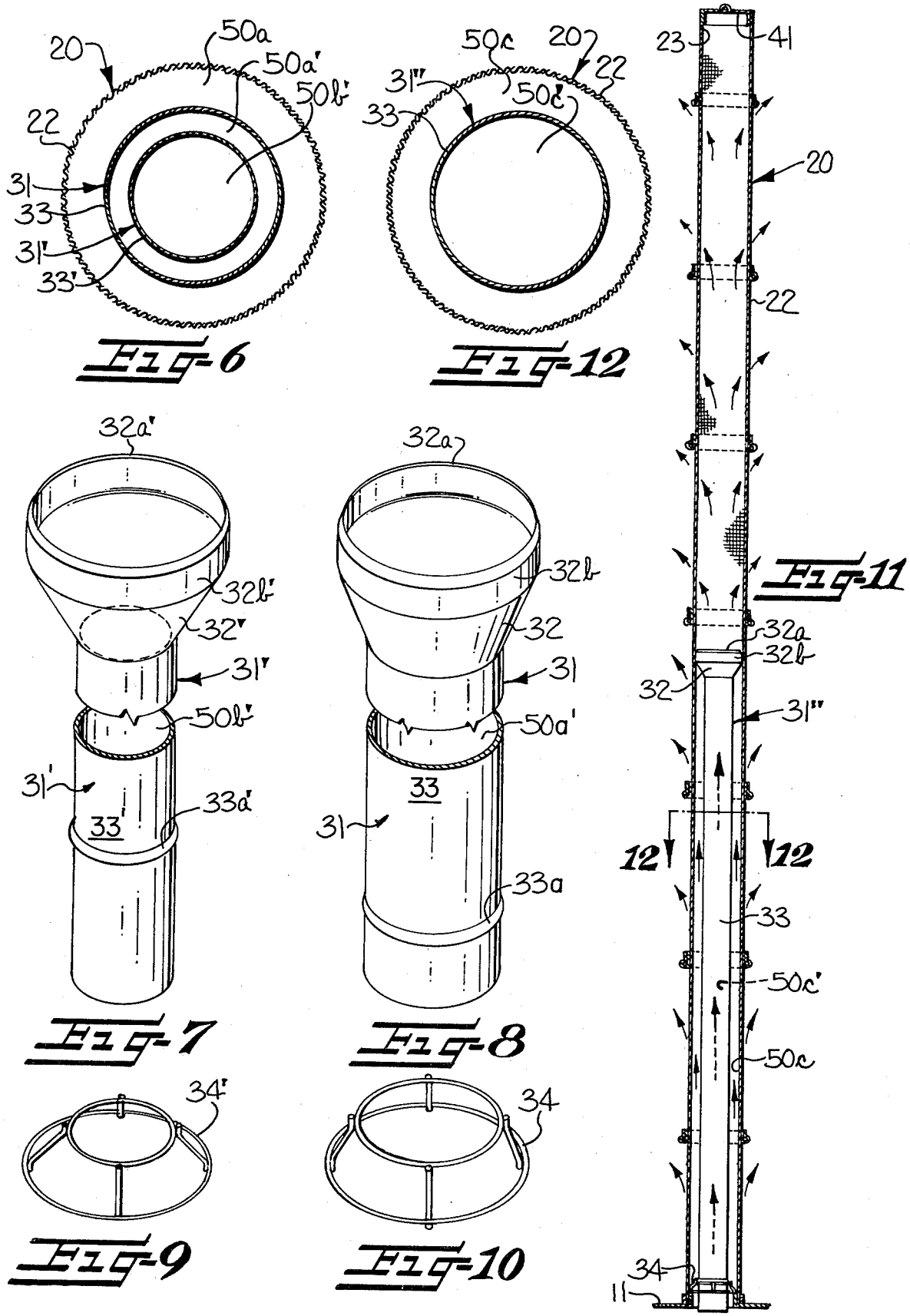

METHOD AND APPARATUS FOR INCREASING THE EFFICIENCY OF INTERNAL COLLECTION FILTER BAGS

FIELD OF THE INVENTION

This invention relates to a method and apparatus for increasing the efficiency of operation and life of internal collection type filter bags used for filtering particulate material entrained in an air stream.

BACKGROUND OF THE INVENTION

As set forth in my prior U.S. Pat. No. 4,231,770, "baghouses" containing a multiplicity of tubular filter bags are utilized in industrial applications for filtering and cleaning large quantities of air to be exhausted to the atmosphere, wherein entrained particulate material is removed from the air stream prior to it being exhausted. In such baghouses the particulate laden air is directed to and through, the filter bags with the particulate material being filtered and retained on the air contacted surfaces of the filter bags. Baghouses are arranged in two basic manners. They may be arranged as described in my prior, U.S. Pat. No. 4,231,770, wherein the air being filtered is directed from the exterior to the interior of filter bags with the filtered particulate material being retained on the exterior surface of the filter bags. In that arrangement a reverse purge of air may be periodically pulsed through the interior of the filter bags in order to dislodge and remove the trapped particulate material from the exterior surface of the filter bags and thereby at least partially restore the filtering efficiency of the bags.

Alternatively, baghouses may be arranged wherein the air being filtered is directed from the interior to the exterior of the tubular filter bags with the filtered particulate material being filtered and retained on the interior surface of the filter bags. In this internal collection arrangement, the bags are cleaned and renewed by periodically mechanically shaking the bags and/or by periodically directing a reverse flow of cleaning air through the bags from without to within them in order to dislodge and remove the trapped particulate material from the interior surfaces of the filter bags. This basic arrangement is shown in U.S. Pat. No. 3,241,297, for example.

A baghouse with this internal collection arrangement can be quite effective in removing particulate material from large volumes of air. Such baghouses are frequently used at electricity generating plants to remove combustion contaminants from air streams prior to the air being released to the atmosphere.

Effective filtration by such a baghouse arrangement, however, is quite costly. Banks of hundreds and even thousands of filter bags are required to effectively filter the large quantities of air typically encountered. And while these filter bags may operate effectively and efficiently when they are new and first put into service, they become increasingly clogged with particulate material during use, notwithstanding the periodic cleaning cycles mentioned above. Specifically, the particulate material tends to build up unevenly along the length of the filter bag and the normal cleaning efforts do not meet the uneven buildup problems presented. The result is a filter bag with uneven air flow along its length which has less than optimum filtering characteristics.

As this clogging progresses the power required to pass the air through the baghouse increases. Also the filtering abilities of the bag deteriorate and the bag itself is prematurely abraded in certain areas to the point of destruction by frictional contact with the particulate material.

In order to get a better understanding of these problems it is instructive to consider in detail the features and operational characteristics of these filter bags as utilized in internal collection baghouses. Such bags are typically cylindrical in shape and some twelve inches in diameter and twenty to forty feet in length. They may be made of various textile materials or inorganic fibers depending on the heat and corrosion conditions present. The bags are usually installed in the baghouse in multiple rows in tensioned and spaced-apart relationship extending vertically with an open bottom and a closed top. In such an installation dirty air containing particulate material is introduced into the interior of the bag at its bottom opening from where the air passes through the bag material along the length of the bag, thereby leaving entrained particulate material along the interior surface of the bag. Circumferential rings are typically positioned along the length of the bag at spaced intervals to maintain the bag in generally open condition. Otherwise, when reverse air flow is used to clean the surfaces of the bags, the bags tend to collapse and essentially close thus detracting from the cleaning action. If the bags are collapsed during reverse flow cleaning, upon completion of the cleaning cycle and repressurization of the system, the abrupt reintroduction of system air to the interior of the collapsed bags tends to suddenly blow them out and rupture them. These problems are alleviated but not truly solved by use of the rings.

Also, during filtering when the dirty air is constantly entering the bottom open entrance end of the bag and passing through the length of the bag, the portion of the bag adjacent to the bottom open end is constantly being contacted by quantities of air equal to the effective volume of the entire bag along with accompanying quantities of abrasive contaminants. This continuous passage of large volumes of air with contaminants at an accompanying relatively high entrance velocity results in the bag portion adjacent the bottom open end being constantly subjected to destructive forces which unduly wear the bag in this area to the point of premature bag failure.

Furthermore, during filtering operations the effective filtering action of the interior of the bag is theoretically equal along its length, there being a theoretically equal air flow along the length of the bag. In actual practice, however, this theoretical concept breaks down quickly after initial use of a new bag. Specifically, during filtering operations the particulate material entrained in the air in the interior of the bag tends to stratify along the length of the bag according to particle type, size and density with particulate particles accumulating in various areas along the interior length of the bag as opposed to a theoretically uniform distribution. This results in certain interior areas of the bag becoming more clogged than others. Notwithstanding the periodic cleaning mentioned above, during actual operation such localized clogging becomes progressively greater and even more localized. Indeed, the usual cleaning efforts often tend to aggravate the localized nature of the clogging rather than alleviate it. The ultimate result is a filter bag operating at much less than its desired filtering efficiency.

Up to now there have been no real solutions for these problems. The only alternatives have been to replace the prematurely failed bags and to overdesign such baghouse systems and supply them with substantially more bags than are theoretically needed in order to compensate for drops in bag filtering efficiency during use. Such measures have been unduly costly and have not solved the real problems.

SUMMARY OF THE INVENTION

In accordance with the present invention it has been discovered that the overall efficiency of operation of an internal collection type of filter bag can be significantly increased by separating the dirty air stream entering the filter bag into distinct portions and directing these portions of air to different interior portions of the filter bag. More particularly, in accordance with the present invention, one or more tubular air channeling members are provided within the filter bag to separate the incoming dirty air flow into distinct portions and to essentially confine the separated distinct portions of dirty air from each other by providing a barrier therebetween; and effectively divide a single filter bag into multiple operating compartments.

In addition to this improvement of filter operating efficiency, the separation of the incoming dirty air stream into distinct air portions also surprisingly substantially increases bag life by decreasing the abrading forces acting on the entrance area of the bag and by also more evenly distributing the forces acting along the length of the bag during the transitions from filtering to cleaning and from cleaning to filtering.

A further feature and advantage of the present invention is that it allows increased air flow to be used during both filtering and cleaning operating phases to obtain more effective filtering and cleaning while also avoiding premature bag failure.

BRIEF DESCRIPTION OF THE DRAWINGS

Some of the features and advantages of the invention having been stated, others will become apparent as the description proceeds when taken in connection with the accompanying drawings, in which:

FIG. 1 is a schematic perspective view, with parts broken away, showing an internal collection baghouse with filter bags containing one embodiment of the separating apparatus for carrying out the method of the invention;

FIG. 2 is a longitudinal sectional view through an internal collection filter bag showing the separating apparatus of one embodiment of the invention;

FIG. 3 is an enlarged longitudinal sectional view corresponding to FIG. 2 with parts broken away;

FIG. 4 is an enlarged longitudinal sectional isometric view corresponding to FIG. 2 with parts broken away;

FIG. 5 is an exploded view corresponding to FIG. 4 with the parts of the apparatus shown spaced apart for clarity;

FIG. 6 is a sectional view taken along line 6—6 of FIG. 3;

FIG. 7 is an enlarged isometric view of the upper air channeling member of the apparatus of the invention shown in FIG. 3;

FIG. 8 is an enlarged isometric view of the lower tube section of the apparatus of the invention shown in FIG. 3;

FIG. 9 is an enlarged isometric view of the upper coupling means of the apparatus of the invention shown in FIG. 3;

FIG. 10 is an enlarged isometric view of the lower coupling means of the apparatus of the invention shown in FIG. 3;

FIG. 11 is a longitudinal sectional view through an internal collection filter bag showing the separating apparatus of another embodiment of the invention; and FIG. 12 is an enlarged sectional view taken along line 12—12 of FIG. 11.

DESCRIPTION OF THE ILLUSTRATED EMBODIMENTS

Referring now to the drawings, FIG. 1 illustrates a typical section of an internal collection type of filtering baghouse 10. Air to be cleaned is introduced into the lower portion of the baghouse 10 from where it is directed, via a manifold 11 of openings, through the open entrance ends of a plurality of internal collection type filter bags 20 positioned in a filtering chamber 12. The filter bags 20 are elongate and hollow and mounted spaced apart in the filtering chamber 12 in a generally vertical orientation. The bags 20 are mounted under tension with their lower ends secured adjacent and around the openings of the manifold 11 and with their upper ends being closed and suspended by upwardly biasing means, such as springs, from a horizontal dividing wall (not shown) so as to maintain the bags in generally open and upright position. Clean air exiting from the exterior surface of the bags 20 is drawn upward through the filtering chamber and thus flows from the baghouse 10 and is exhausted to the atmosphere.

As indicated above, for carrying out the method of this invention, the improved apparatus includes means extending within each filter bag 20 for separating the air to be cleaned flowing into the filter bag into a plurality of portions and for essentially confining and isolating the separated portions of air from each other by providing a barrier therebetween and for directing the respective separated and confined portions of air into engagement with and outwardly through respective different lengthwise portions of the filter bag. In a first embodiment of the invention shown in FIGS. 2-6, such air separating means is shown in the form of a plurality of generally axially aligned tubular air channeling members, and the air separating means of the second embodiment of the invention is shown in FIGS. 11 and 12 in the form of a single air channeling member, to be later described in detail.

Referring more particularly to FIGS. 2-6, the embodiment of the invention there shown is positioned in a conventional internal collection type of tubular filter bag 20. As indicated above, the bag 20 has an open bottom or entrance end 21 secured, as by a clamp 40, adjacent and around an opening 11a of the manifold 11. The bag 20 is made of a gas permeable fabric of material suited for the temperature and conditions of the filtering environment. The bag 20 is suspended vertically and maintained under tension forces to keep it generally open with its sidewall 22 upright. The top end 23 of the bag 20 is closed and secured by a cap or plug 41 from which it is suspended.

The apparatus of the embodiment of the invention shown in FIGS. 2-6, is illustrated in the form of two generally axially aligned tubular air channeling members respectively broadly designated at 31 and 31'. The lower air channeling member 31 is positioned in the lower portion of the bag 20, and the upper air channeling member 31' is positioned in the intermediate portion of the bag 20 in mating or telescoping relation with the lower member 31. Both members 31 and 31' are hollow and preferably imperforate, as shown, and have respective enlarged generally frustoconical or funnel shaped tubular upper portions 32 and 32' and tubular cylinder lower or body portions 33 and 33'. As to the construction of air channeling members 31, 31', the same reference characters shall apply to both of them, with the prime notation added to the reference numerals applied to the upper air channeling member 31' in order to avoid repetitive description.

In installation of the air channeling members 31 and 31' in the bag 20, the upper member 31' is first inserted into the open end 21 of the bag 20. The uppermost edge 32a' of the upper portion 32' of member 31' is tapered inwardly as shown so as to facilitate installation into the supple bag 20. The upper sidewall 32b' of the enlarged tubular or funnel shaped portion 32' extends substantially vertical so that it may fit snugly within the bag 20. The counterpart edge 32a and sidewall 32b of the funnel shaped portion 32 of the lower air channeling member 31 are correspondingly also respectively tapered inwardly and vertical for the same reasons of ease of installation and fit.

The upper member 31' is positioned vertically in the bag 20 to extend for about the middle third B of the lengthwise dimension of the filter bag. The lower member 31 is positioned vertically in the bag 20 at a position essentially below upper member 31' and extending for about the lower third A of the lengthwise dimension of bag 20. The funnel shaped portion 32 of lower member 31 matingly or telescopically receives the lower end portion of the body portion 33' of upper member 31' with the tubular body portion 33' of the upper member 31' being of a smaller diameter than and extending downwardly into the tubular body portion 33 of the lower member 31. The tubular body portion 33 of the lower air channeling member 31 may extend downwardly just below the level of manifold 11. However, the lower end of member 31 may terminate even with or above the bottom of manifold 11 as conditions may dictate.

Lower and upper coupling means 34 and 34' are utilized to maintain lower and upper tubular members 31 and 31' in their respective desired positions. Specifically, upper coupling means 34' rests within and contacts the interior of the frustoconical upper portion 32 of the lower air channeling member 31. Upper coupling means 34' is sized to receive therein the tubular lower or body portion 33' of upper member 31', with suitable outwardly projecting abutment means, or a rim 33a' of body portion 33' contacting and resting on the upper coupling means 34'. Similarly, lower coupling means 34 is inserted in and rests upon the perimeter of opening 11a and receives the tubular lower or body portion 33 of lower member 31 with a rim 33a of body portion 33 also contacting and resting on the lower coupling means 34. The tubular air channeling members 31 and 31' and coupling means 34 and 34' are shown in greater detail in FIGS. 7-10.

It is to be noted that the coupling means 34 and 34' may be of substantially the same construction and are of generally frustoconically shaped skeletal form for free flow of air therethrough. Also, the larger lower end portion of the upper coupling means 34' is sized so as to be engagingly positioned within the enlarged tubular or funnel shaped portion 32 of one of the cooperatively arranged air channeling members, i.e., member 31 (FIG. 3), while engagingly receiving the tubular body portion 33' of the other air channeling member 31' for thereby aiding in maintaining the air channeling members in the desired generally axially alignment.

Lower and upper air channeling members 31 and 31' are desirably constructed of stainless steel or some other sufficiently strong and durable material that will tolerate the environment of use. Lower and upper coupling means 34 and 34' are desirably constructed of similar such material. In a typical installation with a filter bag twelve inches in diameter and thirty feet long, both the lower and upper members 31 and 31' are about ten feet in length with the upper member 31' being of slightly greater overall length due to its lower portion 33' having to extend into the lower member 31. The enlarged upper portions 32 and 32' of the air channeling members 31 and 31' are both of about the same diameter as the bag 20, usually about twelve inches. The diameter of the tubular body portion 33 of the lower or endmost channeling member 31 is about eight inches and the diameter of the body portion 33' of the upper member 31' is about six inches.

As indicated by the arrow 50 shown in FIG. 2 during the filtering operation of the invention, air to be cleaned is directed via the manifold 11 into and through the open entrance end 21 of the filter bag 20, where it is separated into one portion which is directed upwardly through the channel 50a defined between the inside perimeter of the bag 20 and the outside perimeter of the lower air channeling member 31. Thus, the corresponding one portion of the air flows into engagement with and into and through the material of the lower lengthwise portion A of the filter bag 20. Meanwhile, another separated portion of the air is essentially confined from the one portion and flows up the channel 50a' defined by the interior of the body portion 33 of lower member 31. This latter separated portion of air is then separated or subdivided into two more air portions as it meets the tubular lower or body portion 33' of the upper member 31'. It is apparent that one of the latter two subdivided portions of air is directed upwardly through the channel 50b defined between the inside perimeter of the bag 20 and the outside perimeter of the upper air channeling member 31' and flows into engagement with and into and through the material of the middle lengthwise portion B of filter bag 20. Meanwhile, the other of the latter two subdivided portions of air is directed up through the channel 50b' defined by the interior of the lower body portion 33' of the upper air channeling member 31' and from there into engagement with and into and through the material of the upper lengthwise portion C of filter bag 20. The frustoconical shape of portions 32 and 32' of members 31 and 31' acts to gradually introduce the thus separated air portions to the bag portions B and C and avoid excessive entrance air velocities and concentrated bag wear.

By the use of the two internal tubular air channeling members 31 and 31', the entering dirty air is thereby separated into three parts which are then respectively directed into engagement with and through three different lengthwise portions A, B and C of the filter bag 20. This acts to significantly increase the effective filtering efficiency of filter bag 20 since this separation serves to combat the tendency of conventional filter bags to become ineffective in particular areas from stratified clogging. Both filtering and cleaning operations are improved by more uniform bag surface availability. This means that baghouses need not be substantially overdesigned to compensate for the otherwise continuing substantial decrease of bag efficiency.

This separation of air portions likewise alleviates bag wear at various areas and particularly in the area near the bottom entrance end 21 of the bag 20 by reducing and dispersing air volume, velocity and contaminant forces that otherwise tend to concentrate at particular areas along the length of the bag 20, both during filtering and cleaning operations. This reduction of bag forces also leads to increased filtering capacity and improved effective efficiency for a given bag since it allows the use of higher filtering and cleaning air flow rates without unduly shortening bag life.

As thus far shown and described the use of two air channeling members 31 and 31' accomplishes effective separation of dirty air into three parts and results in satisfactory results in typical conditions. Additional sections may be used and additional separations may thereby be effected if conditions warrant such additional separation. Along these same lines under certain air flow and contaminant conditions, sufficiently improved efficiency and bag life may be obtained by the use of a single air channeling member 31" and a single separation as shown in FIGS. 11 and 12. In the embodiment of FIGS. 11 and 12 the single member 31" essentially corresponds to the lower air channeling member 31 of FIGS. 2-6 in shape and position. Therefore, those parts of the air channeling member 31" which are essentially the same as parts of the air channeling member 31 will bear the same reference characters to avoid repetitive description. As shown in FIG. 11 the single member 31" extends about one-half the length of bag 20 and accomplishes a separation of dirty air into two portions via the channels 50c, 50c' which correspond to the respective channels 50a and 50a' of FIGS. 2 and 3.

Although usually it will be preferred to seek to separate and handle the air portions in equal parts by way of having generally equal lengthwise tubular sections, under certain conditions this may not be absolutely required such that in some cases a single air channeling member approximately only one-third the length of the bag 20 may be suitable. Similarly the respective diameters and sizes of the portions of each air channeling member may be varied to suit the particular conditions present. In this regard it should be recognized that, although specific dimensions and terms have been employed to describe the embodiments herein, they have been used in a generic and descriptive sense only and not for purposes of limitation.

That which is claimed is:

1. A method of increasing the efficiency of operation of a filter bag of the internal collection type wherein air to be cleaned is directed through an open entrance end of the filter bag into the filter bag and flows outwardly through the material forming the filter bag, said method comprising separating the air to be cleaned flowing into the filter bag into a plurality of portions while essentially confining and isolating the separated portions of air from each other by directing one of the separated portions of air outside of a tubular cylinder disposed coaxially within the filter bag to cause such separated portion of air to be directed into engagement with and outwardly through a first lengthwise portion of the filter bag, while directing another of the separated portions of air axially through the tubular cylinder in bypassing relation to the first lengthwise portion of the filter bag and into engagement with and outwardly through a second lengthwise portion of the filter bag.

2. A method of increasing the efficiency of operation of a filter bag of the internal collection type wherein air to be cleaned is directed through an open entrance end of the filter bag into the filter bag and flows outwardly through the material forming the filter bag said method comprising separating the air to be cleaned flowing into the filter bag into a plurality of portions at the entrance end of the filter bag while essentially confining and isolating the separated portions of air from each other by directing one of the separated portions of air outside a tubular cylinder disposed coaxially within the filter bag to cause such separated portion of air to be directed into engagement with and outwardly through a first lengthwise portion of the filter bag adjacent the entrance end, while directing another of the separated portions of air axially through the cylinder in bypassing relation to the first lengthwise portion of the filter bag and into engagement with and outwardly through a different lengthwise portion of the filter bag further away from the entrance end of the filter bag.

3. In a combination with a filter bag of the internal collection type wherein air to be cleaned is directed through an open entrance end of the filter bag into the filter bag and flows outwardly through the material forming the filter bag, an apparatus for increasing the efficiency of operation thereof and comprising means including a tubular cylinder extending coaxially within the filter bag for separating air to be cleaned flowing into the filter bag into a plurality of portions and for essentially confining and isolating the separated portions of air from each other by directing one of the separated portions of air outside of the cylinder to cause such separated portions of air to be directed into engagement with and outwardly through a first lengthwise portion of the filter bag, while directing another of the separated portions of air axially through the cylinder in bypassing relation to the first lengthwise portion of the filter bag and into engagement with and outwardly through a second lengthwise portion of the filter bag.

4. Apparatus according to claim 3 wherein an additional tubular cylinder extends within the filter bag and is constructed and arranged for separating the air to be cleaned into an additional portion.

5. Apparatus according to claim 3 wherein said means extending within the filter bag comprises a plurality of generally axially aligned tubular air channeling members, each having a tubular cylinder cooperatively arranged and positioned for directing the respective separated portions of air into engagement with and outwardly through respective different lengthwise portions of the filter bag.

6. Apparatus according to claim 5 wherein each air channeling member comprises a generally uniform diameter tubular cylinder body portion and an enlarged tubular portion extending from one end of said body portion and positioned remote from the air entrance end of the filter bag.

7. Apparatus according to claim 6 wherein the diameters of the tubular cylinder body portions of the air channeling members vary with respect to each other and are arranged within the filter bag so that the largest diameter tubular cylinder body portion is positioned at the entrance end of the filter bag and the air channeling member having the smallest diameter is located furthest from the entrance end of the filter bag.

8. Apparatus according to claim 6 or 7 in which said tubular cylinder body portion of each of said air channeling members is of a length many times greater than that of said enlarged portion thereof.

9. Apparatus according to claim 6 or 7 wherein said cooperatively arranged air channeling members are positioned in overlapping relation, with the proximal end of the tubular cylinder body portion of one of the air channeling members being received within the proximal enlarged portion of the other air channeling member.

10. Apparatus according to claim 6 including coupling means between said air channeling members for aiding in maintaining the air channeling members in their positional relationship.

11. Apparatus according to claim 6 including coupling means supportingly positioned within said enlarged tubular portion of one of said cooperatively arranged air channeling members and engagingly receiving the tubular cylinder body portion of the other air channeling member for thereby aiding in maintaining said air channeling members in general axial alignment.

12. Apparatus according to claim 10 or 11 wherein said coupling means comprises a generally frustoconically shaped skeletal structure for free flow of air therethrough.

13. Apparatus according to claim 11 wherein said tubular cylinder body portion of said other air channeling member being engagingly received within said coupling means is provided with projecting abutment means on the exterior thereof cooperating with said coupling means for being supported therefrom.

14. A method of increasing the efficiency of operation of a filter bag of the internal collection type wherein air to be cleaned is directed through an open entrance end of the filter bag into the filter bag and flows outwardly through the material forming the filter bag said method comprising separating the air to be cleaned flowing into the filter bag into a plurality of portions while essentially confining and isolating the separated portions of air from each other by directing one of the separated portions of air outside of a tubular cylinder disposed coaxially within the filter bag to cause such separated portion of air to be directed into engagement with and outwardly through a first lengthwise portion of the filter bag, while directing another of the separated portions of air axially through the cylinder in bypassing relation to the first lengthwise portion of the filter bag and into engagement with and outwardly through a second lengthwise portion of the filter bag, and while subdividing the separated portion of air flowing axially through the cylinder by directing a portion thereof through another smaller coaxial cylinder and while directing the thus subdivided portions of air through respective different lengthwise portions of the filter bag.

* * * * *